United States Patent Office 2,954,318
Patented Sept. 27, 1960

2,954,318

MITICIDE COMPOSITION

George F. Ludvik, Kirkwood, Mo., assignor to Monsanto Chemical Company, St. Louis, Mo., a corporation of Delaware No Drawing. Filed Feb. 10, 1958, Ser. No. 714,082

6 Claims. (Cl. 167—30)

This invention relates to an improved biologically toxic composition. More specifically this invention relates to mixtures of two known biological toxicants which exhibit much greater toxicity on insects and mites than either of the compounds alone.

The various chlorinated diphenyl sulfones are known as miticides and insecticides, but are not completely effective in eliminating mite activity for substantial periods of time. Similarly parathion is well known as an insecticide, and in general as toxic to most forms of life. This compound is quite satisfactory as an insecticide, but its toxicity to mammals tends to limit its use.

The primary purpose of the present invention is to provide an improved composition which is especially adaptable to the control of mites. A further purpose is to provide a miticidal composition which is extremely effective at low levels of application, whereby dangers to higher forms of life are minimized. A still further purpose of this invention is to provide a mixture of toxicants which have a very pronounced synergistic biological effect.

In accordance with this invention, it has been found that mixtures of an ester of O-(p-nitrophenyl) thiophosphoric acid having the structure:

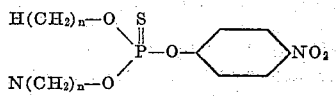

wherein $n$ is an integer from one (1) to two (2) inclusive, with 2,4,5,4'-tetrachlorodiphenyl sulfone, are very effective compositions.

In the practice of this invention the two toxicants may be present in widely varying ratios with respect to each other. It has been found that compositions including a larger proportion of the thiophosphate esters usually give the best results. The preferred compositions are those in which the 2,4,5,4'-diphenyl sulfone is present to the extent of about 2–60% and the thiophosphate ester present to the extent of 40–98%, the percentages being based on the combined toxicants. The novel composition may be modified in a wide variety of formulations. These formulations may be either liquid or solid concentrates depending upon the nature of the diluents used. The preferred compositions are emulsions or stabilized suspensions of a solid compound in a suitable fluid carrier. The preparation of the spray mixture involves the addition of the concentrate to water, which step preferably takes place in the field at time of use. The final formulation involves a dilution so that the active components are present to the extent of about one part per 1,000 to about one part per 200,000 (0.1 to 0.0005 percent). The preferred treating solutions contain from 0.03 to 0.002 percent by weight of active component, from 0.02 to 0.001 percent of the O-p-nitrothiophosphate ester and from 0.01 to 0.001 percent of the 2,4,5,4'-tetrachlorodiphenylsulfone.

The insect or mite toxicant is applied to infested plants by spray, which is preferably continued to saturation or until the excess drips from the foliage. The concentration should be adjusted so that a satisfactory control of the infesting organism can be obtained by the active agent remaining on the plant. If less than a complete saturation of the foliage is to be made, obviously the concentration of the spray should be greater, but it is under these circumstances more difficult to obtain a satisfactory kill with desirable duration of activity at a minimum cost.

Further details of this invention are set forth with respect to the following example.

EXAMPLE 1

Growing bean plants were inoculated with two-spotted-spider-mites from a separately prepared culture. After approximately forty-eight hours the leaves were sprayed to the run-off stage with various concentrations of parathion and 2,4,5,4'-tetrachlorodiphenyl sulfone, the concentrations being designated as one (1) part of active compound to the various proportions of total formulations. This formulation was called an emulsion or dispersion of the toxicants, each of which was previously formulated as an emulsifiable pulverulent concentrate. The effect of the miticides was determined by counting the number of mobile forms alive on each leaf after a period of three weeks had lapsed. The following table sets forth the reagent, the concentration applied to the leaf and the number of mites (mobile stages) alive after the end of the test period.

| Composition | Concentration 1 Part Per | Average Number of Mites Per Leaf |
|---|---|---|
| Tetrachlorodiphenyl sulfone | 10,000 | 2 |
| Tetrachlorodiphenyl sulfone | 20,000 | 54 |
| Parathion | 4,000 | 29.5 |
| Parathion | 8,000 | 91 |
| Mixture of: | | |
|   Tetrachlorodiphenyl sulfone | 10,000 | 0 |
|   Parathion | 4,000 | 0 |
| Mixture of: | | |
|   Tetrachlorodiphenyl sulfone | 20,000 | 0 |
|   Parathion | 8,000 | 0 |

It will be noted that a very much lower mite count is obtained by the mixture of the two toxicants at greater dilutions of toxicants in the treating compound.

EXAMPLE 2

In order to demonstrate the effect of combinations of parathion with 2,4,5,4'-tetrachlorodiphenyl sulfone, a series of miticidal experiments were conducted using as a control mixtures of 4,4'-dichlorodiphenyl sulfone and parathion, which mixture had been previously used. A colony of two-spotted-spider-mites in all life stages was established on black valentine bean plants. The mixture of reagents was sprayed on the leaves of the plant at various concentrations described in the following table. The percentages of the numbers of each of the mobile, quiescent and egg stages were separately determined by observation and the longevity of the miticidal activity was determined by observation on the 14th, 21st and 30th day subsequent to the spraying. The following tabulation shows the observations of the miticidal activity.

*Percent in the miticidal mixture*

| | | | | | | |
|---|---|---|---|---|---|---|
| Percent parathion | 0.005 | 0.005 | 0.0025 | 0.0025 | 0.0013 | 0.0013 |
| Percent 2,4,5,4' tetrachlorodiphenyl sulfone | 0.0025 | | 0.0013 | | 0.00063 | |
| Percent 4,4' dichloro-diphenyl sulfone | | 0.0025 | | 0.0013 | | 0.00063 |
| Percent Kill, 7 days after spraying: | | | | | | |
| Mobile | 100 | 100 | 100 | 97 | 99 | 66 |
| Qui | 100 | 98 | 100 | 66 | 50 | 25 |
| Ova | 100 | 66 | 100 | 50 | 50 | 33 |
| Percent Residual activity, days after spraying: | | | | | | |
| 7 | 100 | 50 | 98 | 50 | 50 | 25 |
| 14 | 100 | 33 | 100 | 0 | 66 | 0 |
| 21 | 100 | 25 | 100 | 0 | | 0 |
| 30 | 100 | 0 | 98 | 0 | 8 | 0 |

The above data demonstrates that the 2,4,5,4'-tetradiphenyl sulfone has a much greater activity in combination with parathion than do similar homologous compounds. This is especially true of the residual activity which lasts for as long as thirty days when the 2,4,5,4'-tetrachlorodiphenyl sulfone is used.

Both solid and liquid formulations may be used. The solid formulations frequently referred to as "dusts" may contain in addition to the said components, diluents, extenders, dispersing agents, fertilizers, stickers and auxiliary toxicants.

These solid compositions are generally in pulverulent state, and may be used in that form to treat infected plants. The solid compositions may also be adapted for dispersion in fluid carriers by the user. The solid diluents used in the formulation of the treating dusts or the dust concentrates are usually formulated with substances which render the compositions permanently dry and free-flowing. Thus hygroscopic materials are to be avoided unless the compositions also contain separate substances to serve as aids to the flowability. Effective solid diluents, preferably pulverulent or granular in form so as to be effective carriers for the active ingredient, are the natural clays, such as china clays, the bentonites and the attapulgites; other minerals in natural state, such as talc, pyrophyllite, quartz, diatomaceous earth, fuller's earth, chalk, rock phosphate and sulfur; and the chemically modified minerals, such as the acid washed bentonite, precipitated calcium phosphate, precipitated calcium carbonate and colloidal silica. These diluents may represent a substantial portion, for example 50 to 98 percent by weight, of the entire formulation as applied to plant or soil. More concentrated compositions will require dilution by the user.

The preferred solid concentrates are the water wettable powders which are adaptable for ready dispersion with water. These usually include a wetting or dispersing agent, which facilitate the preparation of suspensions and maintain them in stable form. These agents may be anionic, cationic or non-ionic types and include conventional soaps, such as the water-soluble salts of long chain carboxylic acids, the amino soaps such as the amine salts of long chain carboxylic acids, the sulfonated animal, vegetable and mineral oils, quaternary salts of high molecular weight acids, resin soaps, such as salts of abietic acid, sulfuric salts of high molecular weight organic compounds, algin soaps, etheylene oxide condensated with fatty acids, alkyl phenols and mercaptans, and other simple and polymeric compositions having both hydrophilic and hydrophobic functions so as to enable the mixing of otherwise immiscible ingredients. Generally, the surface active agents will be only a minor portion of the formulation as used, for example less than 10 percent and frequently as low as 0.05 percent. In general, concentrations of from 0.5 to 5 percent are found to be optimum.

Many of the concentrates are benefited by the incorporation of organic solvents for the active components, such as the water-immiscible organic alcohols, ketones and hydrocarbons, for example isopropanol, benzene, acetone, methylethyl ketone, kerosene, and chlorinated hydrocarbons. The proportions of such organic liquid additives will depend upon the solubility properties of the active ingredients and may require as little as 1 percent or as much as 20 percent in order to provide a uniform concentrated formulation which is capable of ready dilution with water and the formation of a stable suspension.

This application is a continuation-in-part of application Serial No. 555,272, filed December 27, 1955, by George F. Ludvik, now abandoned.

What is claimed is:
1. A composition for controlling insects and mites which comprises as its active ingredients a mixture of from 2 to 60% of 2,4,5,4'-tetra-chlorodiphenylsulfone and from 40 to 95% of the ethyl ester of O(p-nitrophenyl) thiophosphoric acid.
2. A composition for controlling insects and mites which comprises as its active ingredients a mixture of from 2 to 60% of 2,4,5,4'-tetra-chlorodiphenylsulfone and from 40 to 95% of the methyl ester of O(p-nitrophenyl) thiophosphoric acid.
3. A composition for controlling insects and mites which comprises as its active ingredients a mixture of from 2 to 60% of 2,4,5,4'-tetra-chlorodiphenylsulfone, from 40 to 95% of the ethyl ester of O(p-nitrophenyl) thiophosphoric acid, and a wetting agent.
4. A composition for controlling insects and mites which comprises as its active ingredients a mixture of from 2 to 60% of 2,4,5,4'-tetra-chlorodiphenylsulfone, from 40 to 95% of the methyl ester of O(p-nitrophenyl) thiophosphoric acid, and a wetting agent.
5. A composition for controlling insects and mites which comprises as its active ingredients a mixture of from 2 to 60% of 2,4,5,4'-tetra-chlorodiphenylsulfone, from 40 to 95% of the ethyl ester of O(p-nitrophenyl) thiophosphoric acid, a wetting agent and an inert diluent.
6. A composition for controlling insects and mites which comprises as its active ingredients a mixture of from 2 to 60% of 2,4,5,4'-tetra-chlorodiphenylsulfone, from 40 to 95% of the methyl ester of O(p-nitrophenyl) thiophosphoric acid, a wetting agent and an inert diluent.

References Cited in the file of this patent
UNITED STATES PATENTS
2,750,324   Bender _____ June 12, 1956

OTHER REFERENCES

Wadley: The Evidence Required To Show Synergistic Action of Insecticides and a Short-Cut in Analysis, U.S.D.A., ET-223, June 1945, pp. 1-7.